US008307857B2

(12) United States Patent
Kiran et al.

(10) Patent No.: US 8,307,857 B2
(45) Date of Patent: Nov. 13, 2012

(54) INSULATION ASSEMBLY FOR USE WITH AN AUXILIARY POWER UNIT HAVING AN EXHAUST MUFFLER

(75) Inventors: Vunnam Kiran, Andhra Pradesh (IN); Bruce Dan Bouldin, Phoenix, AZ (US); Adam Kowal, Phoenix, AZ (US); Rob Robbins, Chandler, AZ (US); Vincent Doras, Mesa, AZ (US); Jim Lyells, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 177 days.

(21) Appl. No.: 12/850,376

(22) Filed: Aug. 4, 2010

(65) Prior Publication Data

US 2012/0031520 A1 Feb. 9, 2012

(51) Int. Cl.
*F16L 9/14* (2006.01)
(52) U.S. Cl. ...... 138/149; 138/110; 138/157; 428/36.91
(58) Field of Classification Search .................. 138/156, 138/149, 148, 114; 428/36.91
See application file for complete search history.

(56) References Cited

U.S. PATENT DOCUMENTS

| 1,618,455 | A | * | 2/1927 | Lindsay | 138/147 |
| 2,602,764 | A | * | 7/1952 | Billingham | 138/158 |
| 3,185,758 | A | * | 5/1965 | Litz | 174/40 R |
| 3,563,503 | A | * | 2/1971 | Lancaster | 248/49 |
| 4,146,203 | A | * | 3/1979 | Williams | 248/62 |
| 4,530,478 | A | * | 7/1985 | McClellan | 248/62 |
| 4,772,507 | A | * | 9/1988 | Leo et al. | 428/218 |
| 6,403,180 | B1 | * | 6/2002 | Barrall | 428/36.5 |
| 7,100,641 | B2 | * | 9/2006 | Tyrer et al. | 138/110 |
| 7,168,452 | B2 | * | 1/2007 | Sasaki et al. | 138/110 |
| 7,431,125 | B2 | | 10/2008 | Williams | 181/214 |
| 2006/0207673 | A1 | * | 9/2006 | O'Brien et al. | 138/114 |

* cited by examiner

*Primary Examiner* — Patrick F Brinson
(74) *Attorney, Agent, or Firm* — Ingrassia Fisher & Lorenz, P.C.

(57) ABSTRACT

An insulation assembly for use with an APU having an exhaust muffler is disclosed herein. The insulation assembly includes, but is not limited to, a first insulating member that is configured for placement on a top portion of the exhaust muffler and a second insulating member attached to the first insulating member and configured for placement on a bottom portion of the exhaust muffler. The second insulating member is less resistant to heat transfer than the first insulating member.

19 Claims, 6 Drawing Sheets

INSULATION ASSEMBLY FOR USE WITH AN AUXILIARY POWER UNIT HAVING AN EXHAUST MUFFLER

TECHNICAL FIELD

The present invention generally relates to an insulating assembly, and more particularly relates to an insulating assembly for use with an aircraft auxiliary power unit having an exhaust muffler.

BACKGROUND

Modern jet aircraft include a multitude of onboard electrical and pneumatic systems. The power needed to run these systems is generated by operation of the aircraft's jet engines while the aircraft is in flight. When the aircraft is parked at a terminal to load or unload passengers, however, the jet engines are turned off. During these periods, many of the electrical and pneumatic systems onboard the aircraft may, nevertheless, need to be operated. To accommodate such needs for continual power, an auxiliary power unit (hereinafter "APU") is commonly mounted to the aircraft. An APU is essentially an additional jet engine that does not provide any significant thrust for the aircraft during flight, but which can be operated while the aircraft is on the ground (and also while in flight) to generate electricity for the aircraft's electrical systems and provide air to the aircraft Environmental Control Units or ECU's.

The APU is commonly mounted in the tail cone of the aircraft and has an exhaust system that vents out of the rear of the tail cone. When the APU is operated, it emits a very loud noise which, if not muffled, could be an irritant to the members of the ground crew. To reduce the volume of the noise produced by the APU, the APU is commonly fitted with a muffler. The muffler is placed around the APU's exhaust pipe so that all of the APU's exhaust (both noise and gas) are channeled through the muffler. The muffler is designed and constructed to substantially reduce the volume of the noise emitted by the APU.

The muffler is made of metal and has a tendency to get very hot during operation of the APU because of the temperature of the exhaust gasses generated by the APU. It has been observed that the temperatures on the outer skin of the muffler commonly reach above 1,000 degrees Fahrenheit. If the muffler is not insulated, this heat will radiate outwardly from the muffler to the tail cone. Modern aircraft tail cones are commonly made from composite materials and plastics to help keep the overall weight of the aircraft low. Such materials cannot tolerate the high temperatures radiating from the muffler and if exposed to such temperatures for any length of time, may experience some form of failure. Accordingly, aircraft manufactures commonly mandate that the heat radiating from the muffler not exceed a predetermined limit.

To accommodate this, mufflers are commonly fitted with an insulating assembly that substantially encloses the muffler and obstructs the heat from radiating outwardly from the muffler. The insulating assemblies are generally blankets of flexible insulating material that are shrouded in an outer foil shell. The insulating assemblies are commonly constructed from two such blankets, one of which is wrapped around a top portion of the muffler and the other of which is wrapped around the bottom portion of the muffler. Once the two blankets are in place around the muffler, they are attached to one another via any of a variety of suitable fastening means.

The blankets that are used to construct the insulating assembly are typically very dense because of the temperatures that they need to resist. Consequently, the typical insulating assembly is relatively very heavy. Because of the high cost of fuel and because of the direct correlation between overall aircraft weight and fuel consumption, it is desirable to redesign existing insulating assemblies to reduce their weight and thereby reduce the overall weight and rate of fuel consumption of the aircraft. Such weight reductions, however, should be accomplished without compromising the insulating assembly's ability to ensure that the heat that radiates from the muffler remains below the manufacturer's predetermined threshold.

BRIEF SUMMARY

Various non-limiting embodiments of an insulation assembly for use with an APU having an exhaust muffler are disclosed herein.

In a first embodiment, the insulation assembly includes, but is not limited to a first insulating member that is configured for placement on a top portion of the exhaust muffler. A second insulating member is attached to the first insulating member and is configured for placement on a bottom portion of the exhaust muffler. The second insulating member is substantially less resistant to heat transfer than the first insulating member.

In another embodiment, the insulation assembly includes, but is not limited to, a first insulating member that is configured for placement on a top portion of the exhaust muffler. The first insulating member is comprised of a predetermined material and has a first thickness. A second insulating member is attached to the first insulating member and is configured for placement on a bottom portion of the exhaust muffler. The second insulating member is comprised of the predetermined material and has a second thickness that is substantially less than the first thickness, whereby the second insulating member is substantially less resistant to heat transfer than the first insulating member.

In another embodiment, the insulation assembly includes, but is not limited to, a first insulating member that is configured for placement on a top portion of the exhaust muffler. The first insulating member is comprised of a first material. A second insulating member is attached to the first insulating member and is configured for placement on a bottom portion of the exhaust muffler. The second insulating member is comprised of a second material. The second material is substantially less resistant to heat transfer than the first material whereby the second insulating member is substantially less resistant to heat transfer than the first insulating member.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

It has been observed that during operation of the APU, an upper portion of the muffler becomes significantly hotter than a lower portion of muffler. This is due to the fact that heat rises. An insulation assembly is disclosed herein which takes advantage of this phenomenon. The insulation assembly includes an upper insulating member and a lower insulating member that are configured to be mounted to an upper and lower portion of the muffler, respectively. The upper insulating member is configured to offer substantially greater heat transfer resistance than the lower insulating member. In this manner, greater heat transfer resistance is provided at a location where greater heat transfer resistance is needed and less heat transfer resistance is provided at a location where less heat transfer resistance is needed. Such an insulation assembly will permit more heat to escape through the lower portion of the muffler than through the upper portion of the muffler, and thereby forms a heat sink that will cool the upper portion of the muffler. Accordingly, the insulating assembly taught herein may have a lower average surface temperature across its exterior surface during operation of the APU than a prior art insulating assembly configured to provide substantially uniform heat transfer resistance.

The lower insulating member can be configured to provide less heat transfer resistance than the upper insulating member in several ways. For example, less insulating material may be used in the lower insulating member than is used in the upper insulating member. Alternatively, a different material may be used in the lower insulating member than in the upper insulating member, such different material having a lower inherent resistance to heat transfer than the material used in the upper insulating member. Other configurations may employ lower insulating members that have non-uniform densities or that use non-uniform materials to provide intermittent pockets or regions of higher and lower heat transfer resistance. In other embodiments, combinations of any/all of the foregoing configurations may be employed to achieve a lower insulating member having a lower resistance to heat than its corresponding upper insulating member. In still other embodiments, any other method, configuration and/or combination that is effective to produce a lower insulating member that is less heat resistant to heat transfer than the upper insulating member may also be employed.

A primary advantage of the disparity in heat transfer resistance between the upper and lower insulating members is that the insulating assembly can have less weight than a prior art insulating member. For example, in instances where less material is used in the lower insulating member than in the upper insulating member, the lower member will simply weigh less, thus reducing the overall weight of the insulating assembly. In instances where different materials are used in the lower insulating member than in the upper insulating member, the materials used in the lower insulating member may be less dense or lighter than the materials used in the upper insulating member, thus resulting in an overall reduced weight of the insulating assembly. Additionally, the heat sink caused by the lower insulating member's lower resistance to heat may permit the use of less insulating material in the upper insulating member, thereby further reducing the overall weight of the insulating assembly.

A greater understanding of the embodiments of the insulation assembly disclosed herein may be obtained through a review of the illustrations accompanying this application together with a review of the detailed description that follows.

Figure 1:
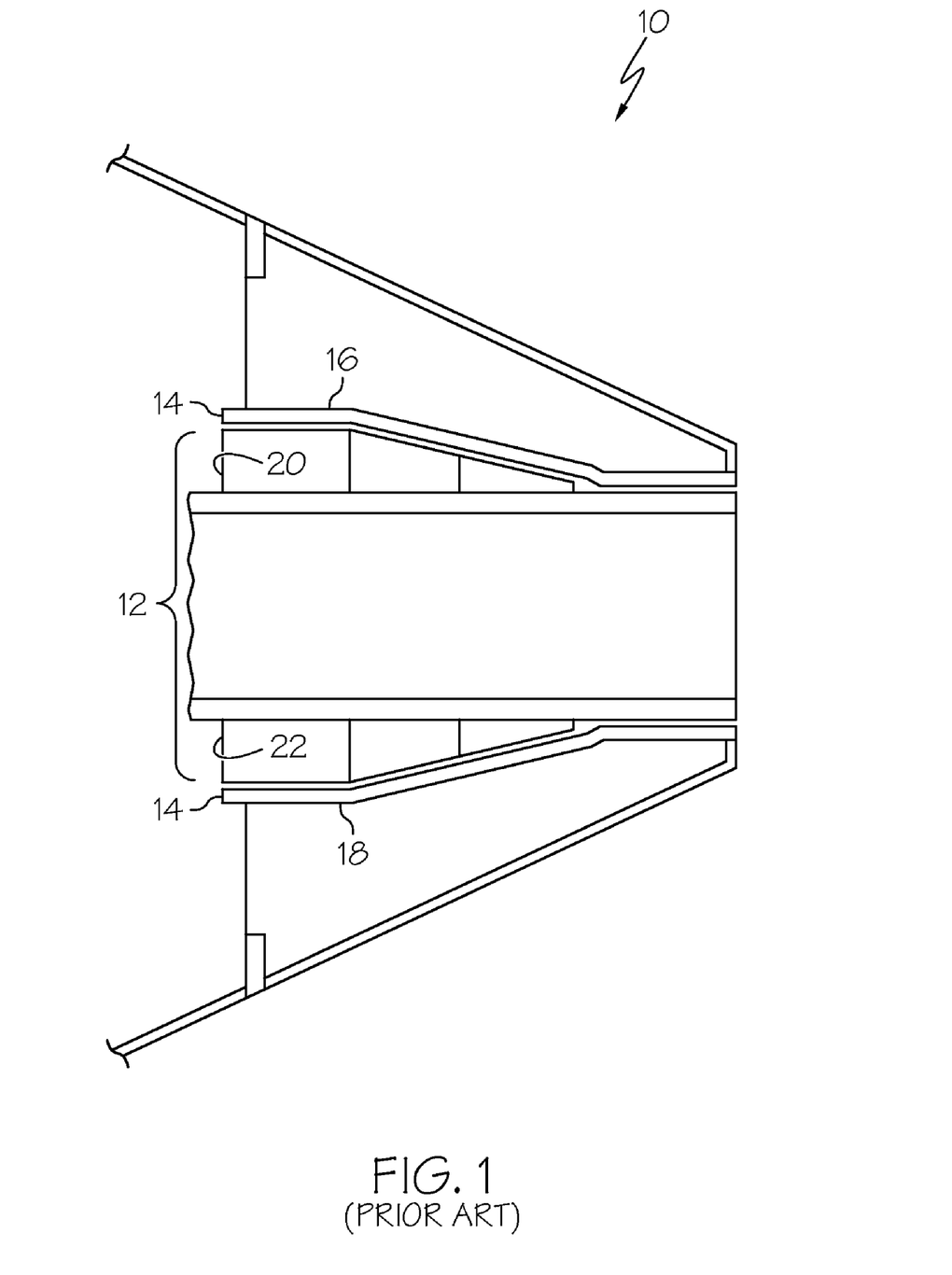
FIG. 1 is a schematic cross-sectional view illustrating a tail cone of an aircraft housing a muffler for an APU and a prior art insulation assembly mounted to the muffler.

FIG. 1 is a schematic cross-sectional view illustrating a tail cone 10 of an aircraft housing a muffler 12 and a prior art insulation assembly 14 mounted to muffler 12. Muffler 12 is positioned downstream of an APU (not shown) to receive the exhaust from the APU. Muffler 12 includes a series of baffles and other structures that are designed to diminish the volume of the noise exiting the APU. For the sake of simplifying the illustrations, these features are not shown.

Prior art insulation assembly 14 includes an upper member 16 and a lower member 18 positioned on muffler 12. Upper member 16 is positioned on an upper portion 20 of muffler 12 and lower member 18 is positioned on a lower portion 22 of muffler 12. Upper member 16 and lower member 18 each comprise a heat resistant material or a plurality of different heat resistant materials arranged in layers and configured to insulate muffler 12 in order to inhibit heat from radiating from muffler 12 to tail cone 10. The heat resistant material used in upper member 16 and lower member 18 includes silica, and is typically configured as a flexible microporous silica blanket. As a result, prior art insulation assembly 14 has the flexibility of a piece of fabric and is wrapped around muffler 12 like a blanket. Upper member 16 and lower member 18 are attached to one another so as to substantially surround muffler 12. By substantially surrounding muffler 12, the high temperature heat which develops on an outer skin of muffler 12 is inhibited from radiating outwardly to tail cone 10.

The upper member 16 and lower member 18 of prior art insulation assembly 14 are each comprised of the same material(s) and each has a substantially equal thickness. Consequently, each offers substantially the same resistance to heat. The outer surface of upper portion 20 of muffler 12 gets hotter than the outer surface of lower portion 22 does due to the fact that heat rises. Because upper member 16 and lower member 18 offer substantially the same resistance to heat, there is no way to transfer the higher temperature heat of upper portion 20 from upper member 16 to lower member 18 and, as a result, the temperature of upper member 16 gets higher than the temperature of lower member 18 during operation of the APU.

Figure 2:
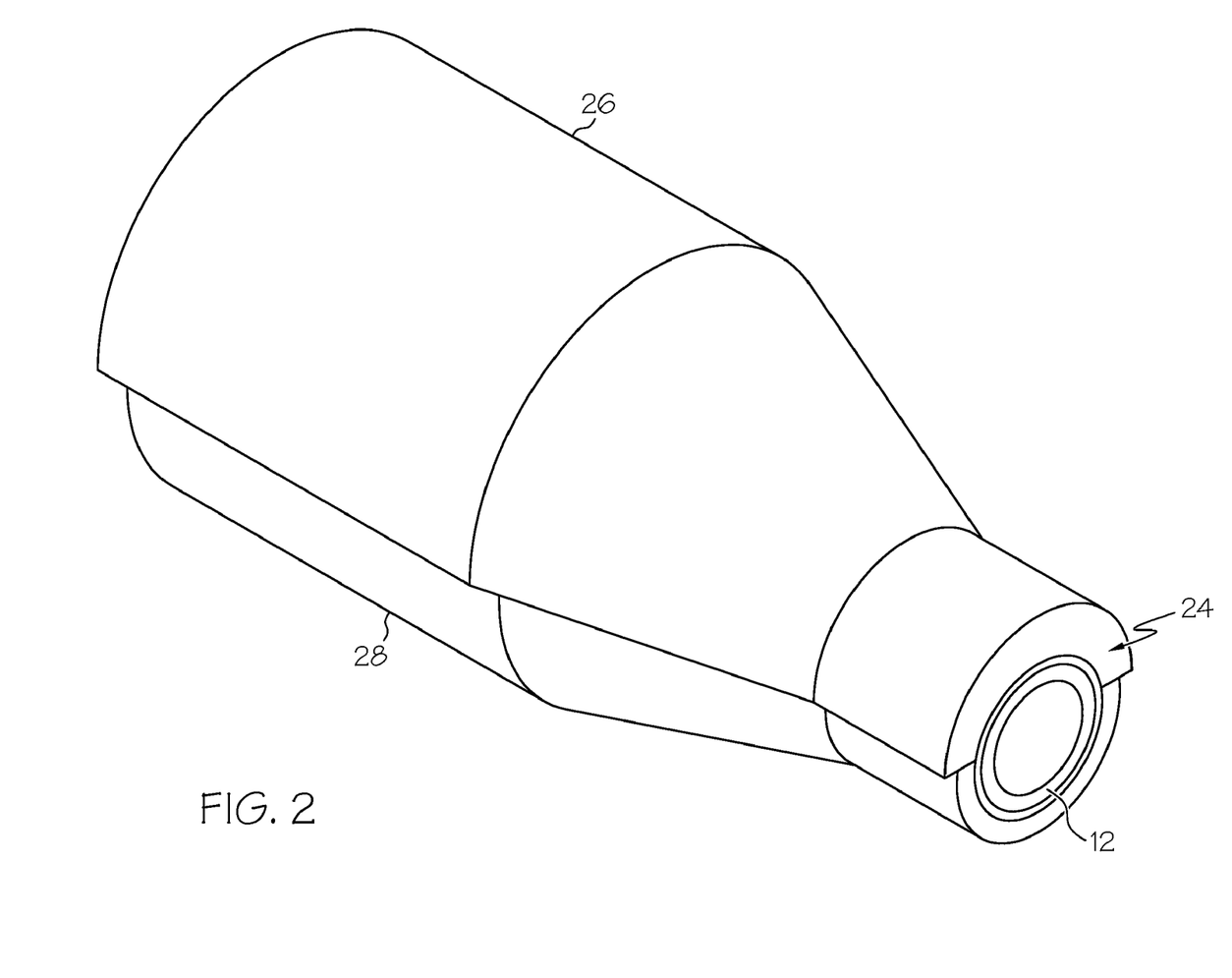
FIG. 2 is a perspective view illustrating a non-limiting embodiment of an insulating assembly as taught herein mounted to the muffler of an APU.

FIG. 2 is a perspective view illustrating a non-limiting embodiment of an insulating assembly 24 as taught herein mounted to muffler 12. Insulating assembly 24 includes an upper member 26 and a lower member 28 that together substantially surround muffler 12. In the illustrated example, upper member 26 and lower member 28 are each configured to substantially conform to the contours of upper portion 20 and lower portion 22 of muffler 12, respectively. Upper member 26 and lower member 28 may be attached to one another in any suitable manner that is effective to join upper member 26 to lower member 28 and that is further capable of withstanding the high temperature heat radiating from muffler 12. Some methods of fastening upper member 26 to lower member 28 include, but are not limited to capstons or eyelets with wire-lock, full metallic band straps, metallic straps attached to one side of the blanket and buckles/receptacles attached to the other blanket side.

Although insulating assembly 24 has been illustrated in FIG. 2 with upper member 26 and lower member 28 each covering substantially equal portions of muffler 12, it should be understood that upper member 26 and lower member 28 may also be configured to cover unequal portions of muffler 12. For example, in some embodiments, upper member 26 may cover only the top third or quarter of muffler 12 while lower member 28 covers the remainder, or vice versa. The specific dimensions and contours of upper member 26 may be dictated by the heat distribution along the upper surface of muffler 12. For example, if only a narrow portion of the upper surface of muffler 12 has relatively higher or the highest temperatures, then a correspondingly narrow upper member 26 may provide adequate insulation to upper portion 20 of muffler 12. The remainder of muffler 12, which would have lower surface temperatures, would be a relatively wide portion and would be covered by a correspondingly wide lower member 28. Such tailoring of the respective sizes of the upper and lower members of insulating assembly 24 to correspond with the heat distribution along the surface of muffler 12 may further reduce the overall weight of insulating assembly 24 as compared with the weight of prior art insulation assembly 14 of FIG. 1.

Figure 3:
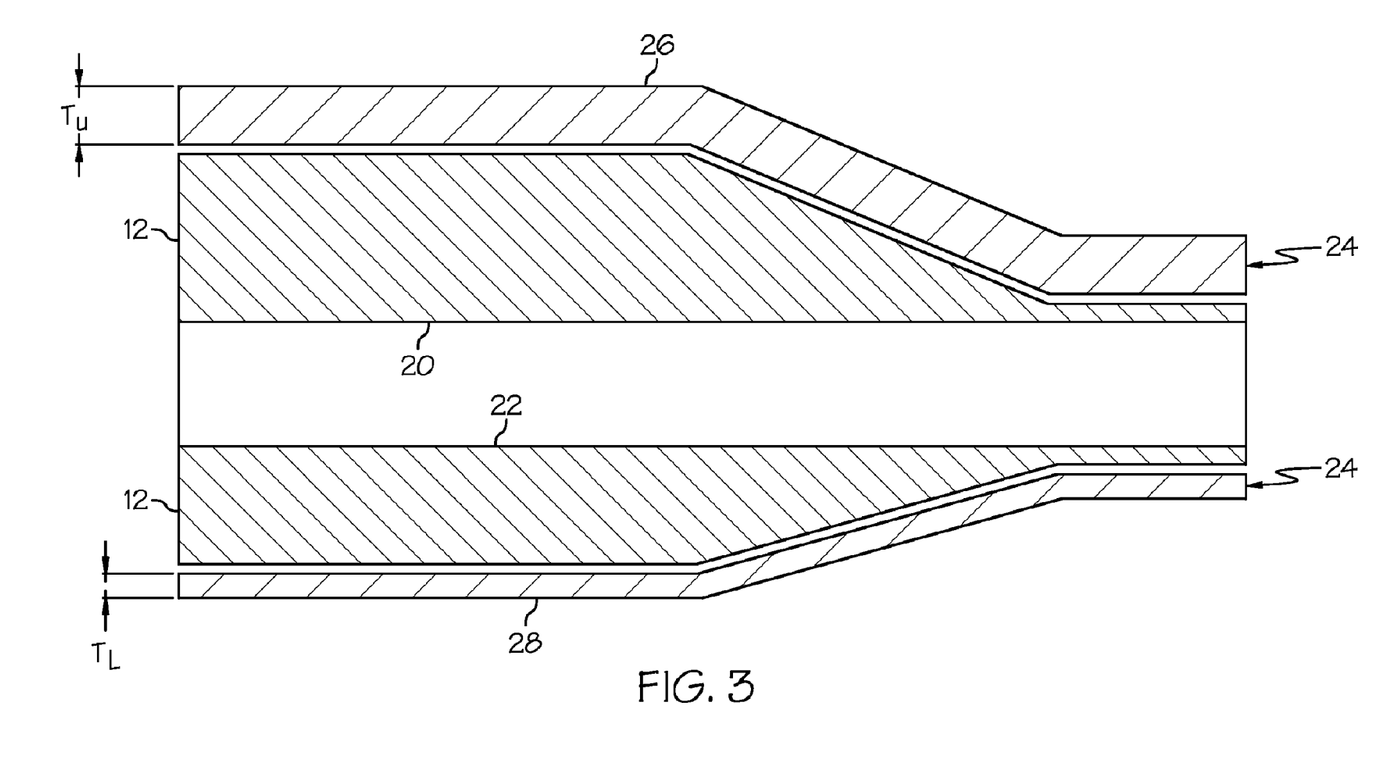
FIG. 3 is a schematic cross-sectional view of the insulating assembly and muffler of FIG. 2.

FIG. 3 is a schematic cross-sectional view of insulating assembly 24 and muffler 12. In the illustrated embodiment, upper member 26 and lower member 28 are each comprised of substantially the same material(s). Upper member 26 has a thickness $T_U$ and lower member 28 has a thickness $T_L$. As illustrated, $T_U$ is greater than $T_L$. Consequently, a greater resistance is provided by upper member 26 to heat radiating from upper portion 20 than is provided by lower member 28 to heat radiating from lower portion 22. This differential in heat transfer resistance will actually allow heat to migrate from upper portion 20 to lower portion 22. This migration may cool upper portion 20 and causes lower portion 22 to experience an increase in temperature. However, because of the natural tendency of heat to rise and the consequential tendency for lower portion 22 to be cooler than upper portion 20, the increase in temperature caused by migration of heat from upper member 26 to lower member 28 can be tolerated without exceeding a predetermined maximum exterior temperature for insulating assembly 24.

Some manufacturers have mandated that the exterior temperature of the insulating assembly used to insulate muffler 12 may not exceed one hundred and fifty degrees centigrade. Utilizing computer software such as ANSYS-FLUENT, which is designed to perform computational fluid dynamics analysis, it has been determined that insulating assembly 24 can have a lower average exterior temperature than prior art insulation assembly 14 (see FIG. 1) when mounted to muffler 12 when both insulating assemblies have equally thick upper members. However, because insulating assembly 24 uses less material as a result of the reduced thickness of lower member 28, insulating assembly 24 has less weight than prior art insulating assembly 14.

Figure 4:
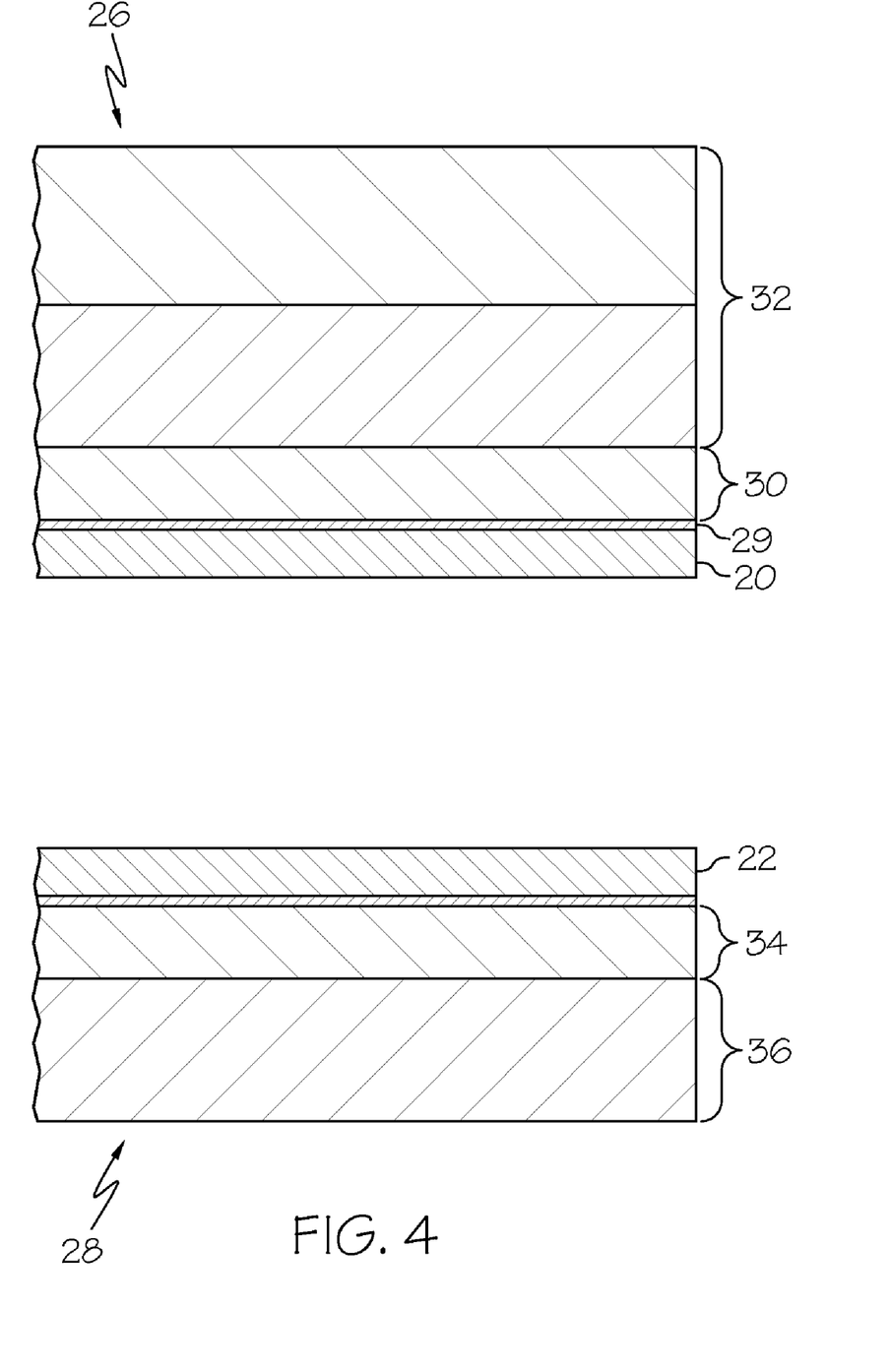
FIG. 4 is a fragmented schematic cross-sectional view of the insulating assembly of FIG. 2.

FIG. 4 is a fragmented schematic cross-sectional view of insulating assembly 24. In this view, the discrete layers of upper member 26 and the discrete layers of lower member 28 are illustrated. Upper member 26 includes a foil layer 29 placed adjacent upper portion 20. In some embodiments, foil layer 29 may comprise a 0.005 inch thick corrugated Corrosion Resistant Steel ("CRES"). Upper member 26 further includes a layer 30 of Pyrogel 6350 which is a silica based aerogel insulating material). In some embodiments, layer 30 may be approximately six millimeters thick. Upper member 26 further includes a layer 32 of insulating material comprising two sub-layers of microporous silica blanket. In some examples, each sub-layer may be three eighths of an inch thick, making layer 32 three quarters of an inch in total thickness. In some embodiments, a second foil layer (not shown) may be positioned above layer 32, thereby enclosing layers 30 and 32 in a foil envelope.

Lower member 28 is configured similarly to upper member 28 and includes a layer 34 of Pyrogel 6350 and a layer 36 of microporous silica blanket. Layer 36 comprises only a single sub-layer of the microporous blanket as compared with layer 32 which comprises two layers. Consequently upper member 26 is thicker, heavier, and more resistant to heat transfer than lower member 28.

Figure 5:
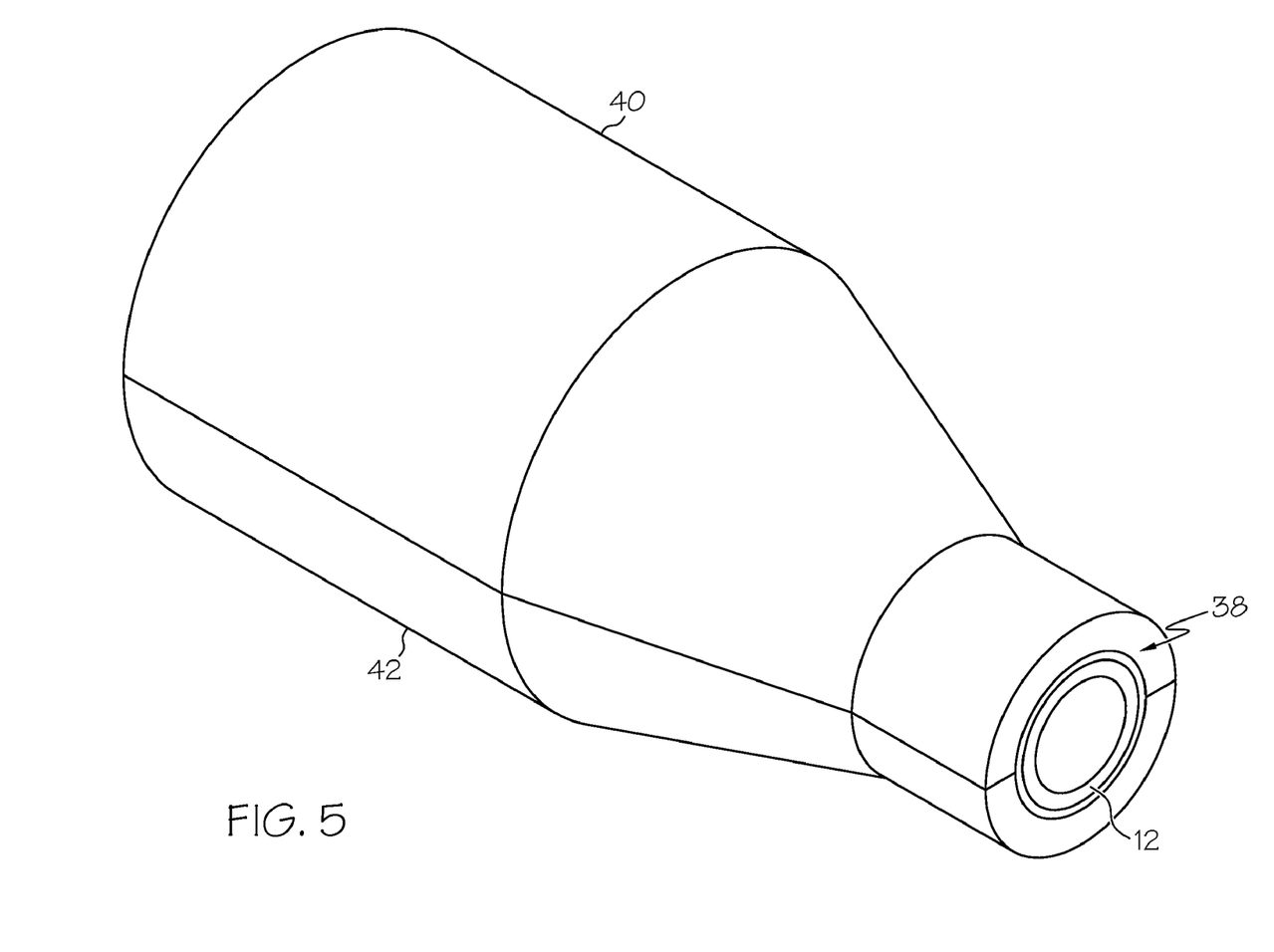
FIG. 5 is a perspective view illustrating another non-limiting embodiment of an insulating assembly as taught herein mounted to the muffler of an APU.

FIG. 5 is a perspective view illustrating another non-limiting embodiment of an insulating assembly 38 as taught herein mounted to muffler 12. Insulating assembly 38 includes an upper member 40 and a lower member 42 that together substantially surround muffler 12. In the illustrated example, upper member 40 and lower member 42 are each configured to substantially conform to the contours of the upper and lower portions of muffler 12, respectively. Upper member 40 and lower member 42 may be attached to one another in any of the manners described above with respect to insulating assembly 24 of FIG. 2. Although insulating assembly 38 has been illustrated in FIG. 5 with upper member 40 and lower member 42 each covering substantially equal portions of muffler 12, it should be understood that upper member 40 and lower member 42 may be configured to cover unequal portions of muffler 12, as described above.

Figure 6:
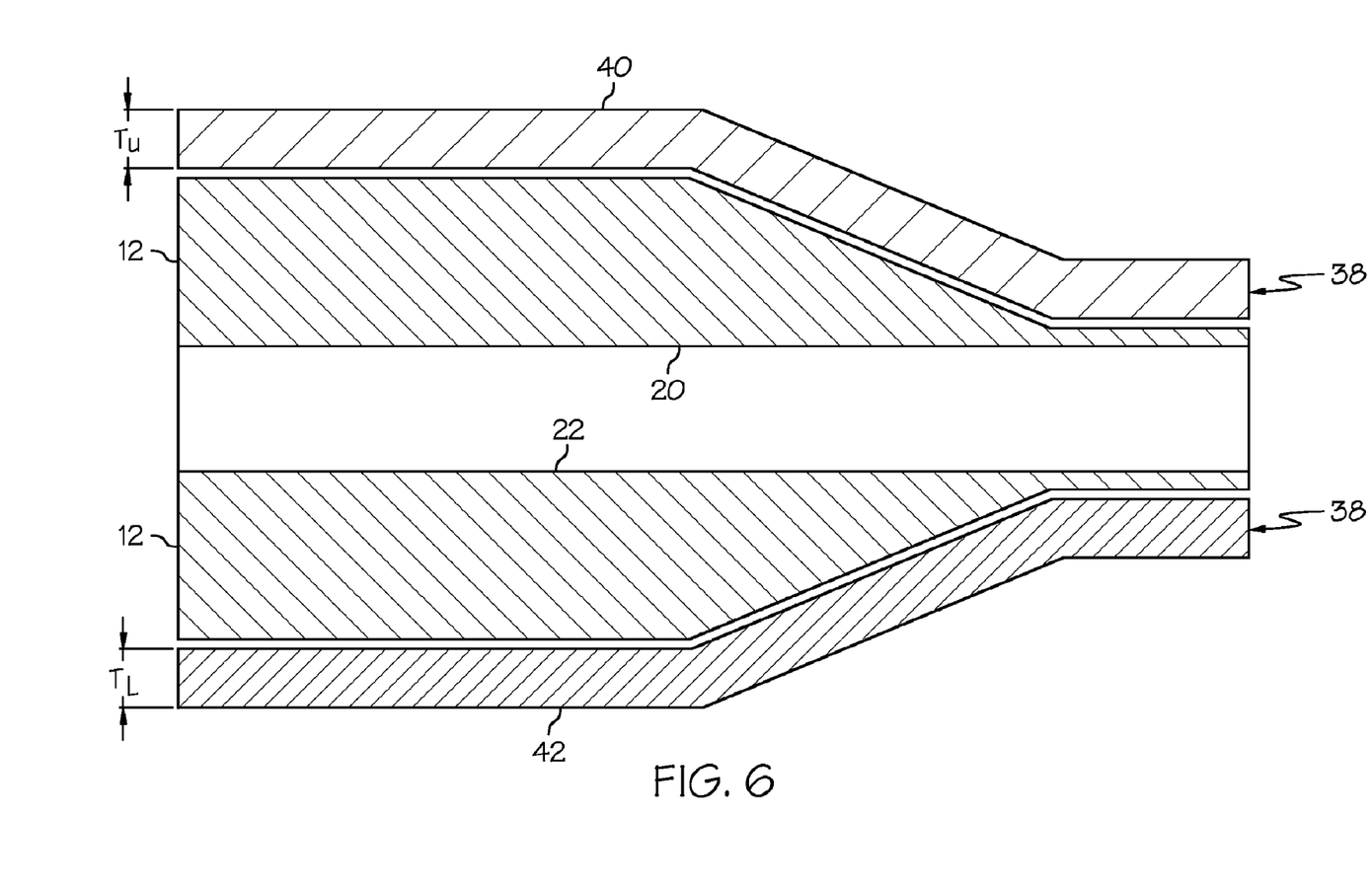
FIG. 6 is a schematic cross-sectional view of the insulating assembly and muffler of FIG. 5.

FIG. 6 is a schematic cross-sectional view of insulating assembly 38 and muffler 12. As illustrated by the use of different cross hatching patterns, upper member 40 and lower member 42 are made of different material. For example, upper member 40 may comprise the same materials described above with respect to upper member 26 shown in FIG. 4. Lower member 42 may comprise glass wool, microporous silica and/or multi-ply silica with felt/aluminum foil. In some embodiments, upper member 40 and lower member 42 may have no materials in common while in other embodiments, upper member 40 and lower member 42 may share some materials. In still other embodiments, upper member 40 and lower member 42 may share all materials, but in differing amounts or ratios that would provide a difference in heat transfer resistance between the upper and lower members.

In insulating assembly 38, upper member 40 is constructed of materials having a greater resistance to heat than the materials of lower member 42. Consequently, upper member 40 will provide greater heat transfer resistance to the hotter areas of muffler 12 and lower member 42 will serve as a heat sink capable of drawing heat away from upper portion 20 of muffler 12 during operation of the APU. Lower member 42 is made of lighter materials than upper member 40. The use of lighter materials in lower member 42 serves to reduce the overall weight of insulating assembly 38 as compared with prior art insulation assembly 14.

As illustrated in FIG. 6, the thickness $T_U$ of upper member 40 is substantially equal to the thickness $T_L$ of lower member 42. This substantially equal thickness results in a substantially uniform, continuous outer periphery of insulating assembly 38. This, in turn, can facilitate the attachment of a firewall (not shown) around the outer periphery of insulating assembly 38. Such a firewall is commonly used in the construction of modern aircraft to control the spread of fire between compartments on board an aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An insulation assembly for use with an auxiliary power unit (APU) having an exhaust muffler, the insulation assembly comprising:
   a first insulating member configured for placement on a top portion of the exhaust muffler; and
   a second insulating member attached to the first insulating member and configured for placement on a bottom portion of the exhaust muffler, the second insulating member being substantially less resistant to heat transfer than the first insulating member.

2. The insulation assembly of claim 1, wherein the first insulating member and the second insulating member substantially surround an outer surface of the exhaust muffler.

3. The insulation assembly of claim 1, wherein the first insulating member and the second insulating member cooperate to restrict a temperature of an external surface of the insulation assembly to a predetermined temperature during operation of the APU.

4. The insulation assembly of claim 3, wherein the predetermined temperature is one hundred and fifty degrees centigrade.

5. The insulation assembly of claim 1, wherein the first insulating member and the second insulating member comprise substantially the same material.

6. The insulation assembly of claim 1, wherein the first insulating member and the second insulating member have substantially equal thicknesses.

7. The insulation assembly of claim 1, wherein the first insulating member and the second insulating member have substantially unequal thicknesses.

8. An insulation assembly for use with an auxiliary power unit (APU) having an exhaust muffler, the insulation assembly comprising:
   a first insulating member configured for placement on a top portion of the exhaust muffler, the first insulating member having a continuous outer periphery, the first insulating member being comprised of a foil layer, a layer of a first insulating material having a first thickness, and two layers of a second insulating material each having a second thickness; and
   a second insulating member attached to the first insulating member and configured for placement on a bottom portion of the exhaust muffler, the second insulating member having a continuous outer periphery, the second insulating member being comprised of a foil layer, a layer of the first insulating material having the first thickness, and a single layer of the second insulating material having the second thickness, whereby an overall thickness of the second insulating member substantially less than an overall thickness of the first insulating member, and whereby the second insulating member is substantially less resistant to heat transfer than the first insulating member.

9. The insulation assembly of claim 8, wherein the predetermined material comprises silica.

10. The insulation assembly of claim 8, wherein the first insulating member comprises a first microporous silica blanket and wherein the second insulating member comprises a second microporous silica blanket.

11. The insulation assembly of claim 10, wherein the first insulating member and the second insulating member each further comprise a silica aerogel material.

12. The insulation assembly of claim 8, wherein the first insulating member and the second insulating member substantially surround an outer surface of the exhaust muffler.

13. The insulation assembly of claim 8, wherein the first insulating member and the second insulating member cooperate to restrict a temperature of an external surface of the insulation assembly to a predetermined temperature during operation of the APU.

14. The insulation assembly of claim 13, wherein the predetermined temperature is one hundred and fifty degrees centigrade.

15. An insulation assembly for use with an auxiliary power unit (APU) having an exhaust muffler, the insulation assembly comprising:
   a first insulating member configured for placement on a top portion of the exhaust muffler, the first insulating member having a continuous outer periphery, the first insulating member being comprised of a foil layer and a layer of a first material; and
   a second insulating member attached to the first insulating member and configured for placement on a bottom portion of the exhaust muffler, the second insulating member having a continuous outer periphery, the second insulating member being comprised of a foil layer and a layer of a second material, the second material being substantially less resistant to heat transfer than the first material, whereby the second insulating member is substantially less resistant to heat transfer than the first insulating member.

16. The insulation assembly of claim 15, wherein the first insulating member and the second insulating member are substantially equally thick.

17. The insulation assembly of claim 15, wherein the first insulating member and the second insulating member substantially surround an outer surface of the exhaust muffler.

18. The insulation assembly of claim 15, wherein the first insulating member and the second insulating member cooperate to restrict a temperature of an external surface of the insulation assembly to a predetermined temperature during operation of the APU.

19. The insulation assembly of claim 18, wherein the predetermined temperature is one hundred and fifty degrees centigrade.

* * * * *